US011060481B2

(12) United States Patent
Smith et al.

(10) Patent No.: US 11,060,481 B2
(45) Date of Patent: *Jul. 13, 2021

(54) TRANSLATING COWL THRUST REVERSER SYSTEM WITH OVER-STOW UNLOCKING CAPABILITY

(71) Applicant: HONEYWELL INTERNATIONAL INC., Morris Plains, NJ (US)

(72) Inventors: Danis Burton Smith, Chandler, AZ (US); Robert Romano, Tempe, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 54 days.

This patent is subject to a terminal disclaimer.

(21) Appl. No.: 16/529,721

(22) Filed: Aug. 1, 2019

(65) Prior Publication Data
US 2020/0124001 A1 Apr. 23, 2020

Related U.S. Application Data

(63) Continuation of application No. 15/019,055, filed on Feb. 9, 2016, now Pat. No. 10,415,504.

(51) Int. Cl.
F02K 1/72 (2006.01)
F02K 1/76 (2006.01)
(Continued)

(52) U.S. Cl.
CPC ............... F02K 1/72 (2013.01); F02K 1/605 (2013.01); F02K 1/625 (2013.01); F02K 1/76 (2013.01);
(Continued)

(58) Field of Classification Search
CPC . F02K 1/605; F02K 1/625; F02K 1/76; F02K 1/766; F02K 1/72
See application file for complete search history.

(56) References Cited

U.S. PATENT DOCUMENTS 5,826,823 A    10/1998 Lymons et al.
6,021,636 A *  2/2000 Johnson ............... F02K 1/766
                                              60/226.2
(Continued)

FOREIGN PATENT DOCUMENTS

EP    1478836 A1    11/2004

*Primary Examiner* — Todd E Manahan
*Assistant Examiner* — Thuyhang N Nguyen
(74) *Attorney, Agent, or Firm* — Lorenz & Kopf, LLP

(57) ABSTRACT

A thrust reverser system for a turbine engine includes a support structure, a transcowl, a door, a lock, and a first elastic element. The transcowl is mounted on the support structure and is translatable between a stowed position, a deployed position, and an over-stow position. The door is pivotally coupled to the support structure and is rotatable between at least a first position, a second position, and a third position. The lock is movable between a locked position, to prevent transcowl translation toward the deployed position, and an unlocked position, to allow transcowl translation toward the deployed position. The lock is only able to move to the unlocked position when the transcowl is in the over-stow position. The first elastic element is disposed within the stowed position aperture and, when engaging both the support structure and the transcowl, supplies a force to the transcowl.

12 Claims, 8 Drawing Sheets

(51) Int. Cl.
 *F02K 1/60* (2006.01)
 *F02K 1/62* (2006.01)

(52) U.S. Cl.
 CPC ........ *F02K 1/766* (2013.01); *F05D 2300/501* (2013.01); *Y02T 50/60* (2013.01)

(56) References Cited

U.S. PATENT DOCUMENTS

| | | |
|---|---|---|
| 6,681,559 B2 | 1/2004 | Johnson |
| 8,628,128 B2 | 1/2014 | Sternberger et al. |
| 9,109,536 B2 | 8/2015 | Willett et al. |
| 10,415,504 B2 * | 9/2019 | Smith ..................... F02K 1/76 |
| 2003/0019206 A1 | 1/2003 | Johnson |
| 2008/0134664 A1 | 6/2008 | Brannon et al. |
| 2013/0264399 A1 | 10/2013 | Wingett et al. |
| 2014/0270935 A1 | 9/2014 | Willett et al. |

* cited by examiner

TRANSLATING COWL THRUST REVERSER SYSTEM WITH OVER-STOW UNLOCKING CAPABILITY

CROSS-REFERENCE TO RELATED APPLICATIONS

This application is a continuation application of U.S. patent application Ser. No. 15/019,055, filed Feb. 9, 2016, now U.S. Pat. No. 10,415,504.

TECHNICAL FIELD

The present invention relates to a thrust reverser system for a turbine engine, and more particularly to a thrust reverser system that includes over-stow unlocking capability.

BACKGROUND

When turbine-powered aircraft land, the wheel brakes and the imposed aerodynamic drag loads (e.g., flaps, spoilers, etc.) of the aircraft may not be sufficient to achieve the desired stopping distance. Thus, the engines on most turbine-powered aircraft include thrust reversers. Thrust reversers enhance the stopping power of the aircraft by redirecting the engine exhaust airflow in order to generate reverse thrust. When stowed, the thrust reverser typically forms a portion the engine nacelle and forward thrust nozzle. When deployed, the thrust reverser typically redirects at least a portion of the airflow (from the fan and/or engine core exhaust) forward and radially outward, to help decelerate the aircraft.

Various thrust reverser designs are commonly known, and the particular design utilized depends, at least in part, on the engine manufacturer, the engine configuration, and the propulsion technology being used. Thrust reverser designs used most prominently with turbofan engines fall into two general categories: (1) fan flow thrust reversers, and (2) mixed flow thrust reversers. Fan flow thrust reversers affect only the bypass airflow discharged from the engine fan. Whereas, mixed flow thrust reversers affect both the fan airflow and the airflow discharged from the engine core (core airflow).

Fan flow thrust reversers are typically used on relatively high-bypass ratio turbofan engines. Fan flow thrust reversers include so-called "Cascade-type" or "Translating Cowl-type" thrust reversers. Fan flow thrust reversers are generally positioned circumferentially around the engine core aft of the engine fan and, when deployed, redirect fan bypass airflow through a plurality of cascade vanes disposed within an aperture of a reverse flow path. Typically, fan flow thrust reverser designs include one or more translating sleeves or cowls ("transcowls") that, when deployed, open an aperture, expose cascade vanes, and create a reverse flow path. Fan flow reversers may also include so-called pivot doors or blocker doors which, when deployed, rotate to block the forward thrust flow path.

In contrast, mixed flow thrust reversers are typically used with relatively low-bypass ratio turbofan engines. Mixed flow thrust reversers typically include so-called "Target-type," "Bucket-type," and "Clamshell Door-type" thrust reversers. These types of thrust reversers typically use two or more pivoting doors that rotate, simultaneously opening a reverse flow path through an aperture and blocking the forward thrust flow path. However, a transcowl type thrust reverser could also be configured for use in a mixed flow application. Regardless of type, mixed flow thrust reversers are necessarily located aft or downstream of the engine fan and core, and often form the aft part of the engine nacelle.

Transcowl type thrust reversers transition from the forward thrust state to the reverse thrust state by translating the transcowl aft so as to open a reverse thrust aperture, and simultaneously rotating a set of doors so as to obstruct the forward thrust nozzle. This coordinated motion between the transcowl and the doors is typically achieved by the use of a linkage rod arrangement, which connects the doors to the transcowl so that translational motion of the transcowl causes rotational motion of the doors.

Typically, these types of thrust reverser systems are equipped with a redundant locking system to ensure that inadvertent in-flight deployment is extremely improbable. This locking system is typically arranged to prevent the transcowl from translating aft until it is commanded to do so. Though highly unlikely, it is postulated that the presently known locking systems could become inoperable, resulting in an uncommanded, uncontrolled, and undesirable deployment of the transcowl.

Hence, there is a need for means of preventing an uncommanded deployment of thrust reverser system transcowls. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a thrust reverser system for a turbine engine includes a support structure, a transcowl, a door, a lock, and a first elastic element. The support structure is configured to be mounted to the turbine engine. The transcowl is mounted on the support structure and is axially translatable, relative to the support structure, between (i) a stowed position, in which the transcowl is displaced from the support structure by a first distance to form a stowed position aperture, (ii) a deployed position, in which the transcowl is displaced from the support structure a second distance that is larger than the first distance, and (iii) an over-stow position, in which the transcowl is displaced from the support structure by a third distance that is less than the first distance, thereby decreasing the size of the stowed position aperture. The door is pivotally coupled to the support structure and is rotatable between at least a first position, a second position, and a third position when the transcowl translates between the stowed position, the deployed position, and the over-stow position, respectively. The door is configured, when it is in the second position, to redirect engine airflow to thereby generate reverse thrust. The lock is coupled to the support structure and is movable between a locked position, in which transcowl translation toward the deployed position is prevented, and an unlocked position, in which transcowl translation toward the deployed position is allowed. The lock is configured so that it is prevented from moving from the locked position to the unlocked position when the transcowl is in the stowed position and is only able to move to the unlocked position when the transcowl is in the over-stow position. The first elastic element is disposed within the stowed position aperture and engages both the support structure and the transcowl at least when the transcowl is in and between the stowed and over-stow positions. The first elastic element is configured, when engaging both the support structure and the transcowl, to supply a force to the transcowl that biases the transcowl toward the deployed position. The force in the over-stow position is greater than the force in the stowed position.

In another embodiment, a thrust reverser system for a turbine engine includes a support structure, a transcowl, a plurality of doors, a lock, and a first elastic element. The support structure is configured to be mounted to the engine. The transcowl is mounted on the support structure and is axially translatable, relative to the support structure, between (i) a stowed position, in which the transcowl is displaced from the support structure by a first distance to form a stowed position aperture, (ii) a deployed position, in which the transcowl is displaced from the support structure a second distance that is larger than the first distance, and (iii) an over-stow position, in which the transcowl is displaced from the support structure by a third distance that is less than the first distance, thereby decreasing the size of the stowed position aperture. The doors are pivotally coupled to the support structure, and each door is rotatable between at least a first position, a second position, and a third position when the transcowl translates between the stowed position, the deployed position, and the over-stow position, respectively. Each door is configured, when it is in the second position, to redirect engine airflow to thereby generate reverse thrust. The lock is coupled to the support structure and is movable between a locked position, in which transcowl translation toward the deployed position is prevented, and an unlocked position, in which transcowl translation toward the deployed position is allowed. The lock is configured so that it is prevented from moving from the locked position to the unlocked position when the transcowl is in the stowed position and is only able to move to the unlocked position when the transcowl is in the over-stow position. The first elastic element is disposed within the stowed position aperture and engages both the support structure and the transcowl at least when the transcowl is in and between the stowed and over-stow positions. The first elastic element is configured, when engaging both the support structure and the transcowl, to supply a force to the transcowl that biases the transcowl toward the deployed position. The force in the over-stow position is greater than the force in the stowed position.

In yet another embodiment, a turbofan or turbojet engine includes a gas turbine engine and a nacelle coupled to and at least partially surrounding the gas turbine engine. The nacelle comprises a thrust reverser system that includes a support structure, a transcowl, a plurality of doors, a lock, a first elastic element, and a second elastic element. The support structure is configured to be mounted to the engine. The transcowl is mounted on the support structure and is axially translatable, relative to the support structure, between (i) a stowed position, in which the transcowl is displaced from the support structure by a first distance to form a stowed position aperture, (ii) a deployed position, in which the transcowl is displaced from the support structure a second distance that is larger than the first distance, and (iii) an over-stow position, in which the transcowl is displaced from the support structure by a third distance that is less than the first distance, thereby decreasing the size of the stowed position aperture. The doors are pivotally coupled to the support structure, and each door is rotatable between at least a first position, a second position, and a third position when the transcowl translates between the stowed position, the deployed position, and the over-stow position, respectively. Each door is configured, when it is in the second position, to redirect engine airflow to thereby generate reverse thrust. The lock is coupled to the support structure and is movable between a locked position, in which transcowl translation toward the deployed position is prevented, and an unlocked position, in which transcowl translation toward the deployed position is allowed. The lock is configured so that it is prevented from moving from the locked position to the unlocked position when the transcowl is in the stowed position and is only able to move to the unlocked position when the transcowl is in the over-stow position. The first elastic element is disposed within the stowed position aperture and engages both the support structure and the transcowl at least when the transcowl is in and between the stowed and over-stow positions. The first elastic element is configured, when engaging both the support structure and the transcowl, to supply a force to the transcowl that biases the transcowl toward the deployed position. The force in the over-stow position greater than the force in the stowed position. The second elastic elements are coupled to the transcowl. Each of the second elastic elements engages one of the doors at least when the doors are in the third position. Each of the second elastic elements is configured, at least when the door is in the third position, to supply a bias force that biases the door it engages toward the first position.

Furthermore, other desirable features and characteristics of the thrust reverser system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
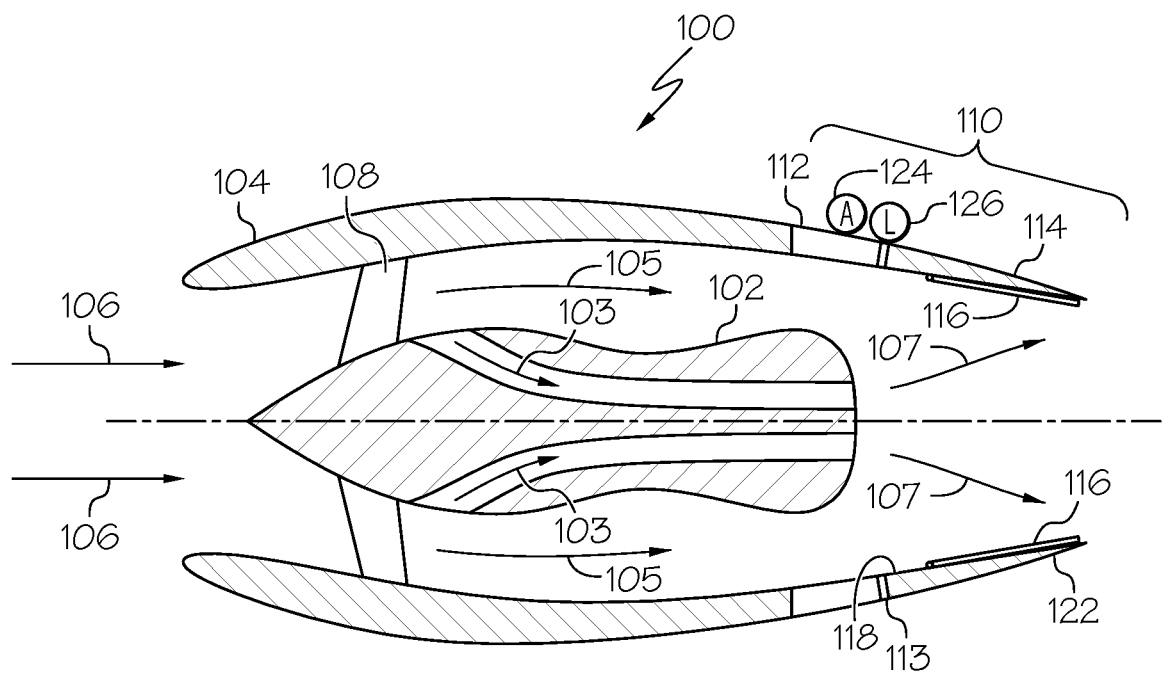
FIGS. 1 and 2 depict a turbofan engine equipped with a mixed flow thrust reverser system, and with the thrust reverser system in a stowed position and deployed position, respectively.
Figure 2:
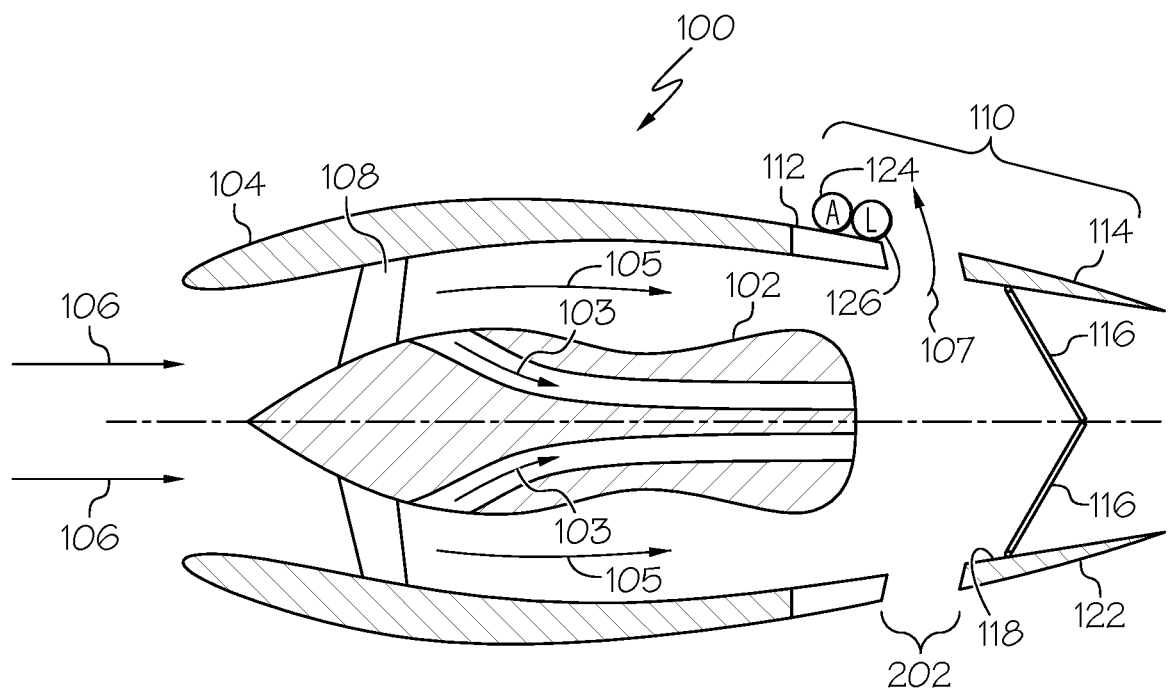
Figure 3:
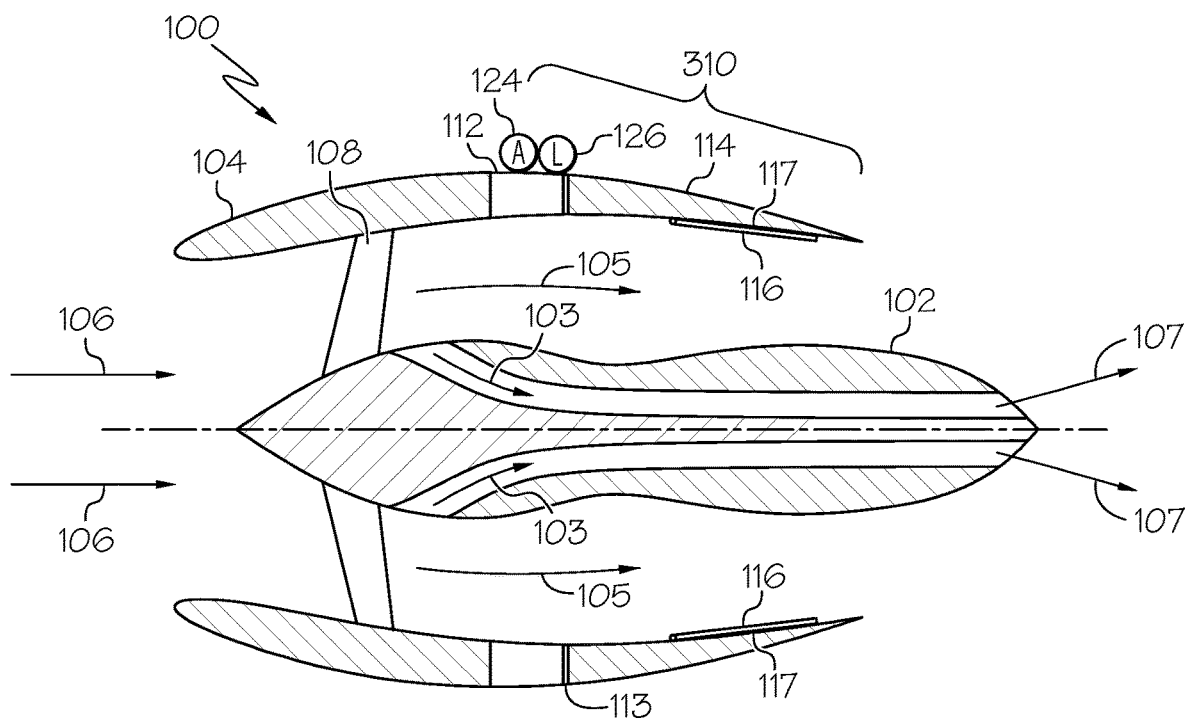
FIGS. 3 and 4 depict a turbofan engine equipped with a fan flow thrust reverser system, and with the thrust reverser system in a stowed position and deployed position, respectively.
Figure 4:
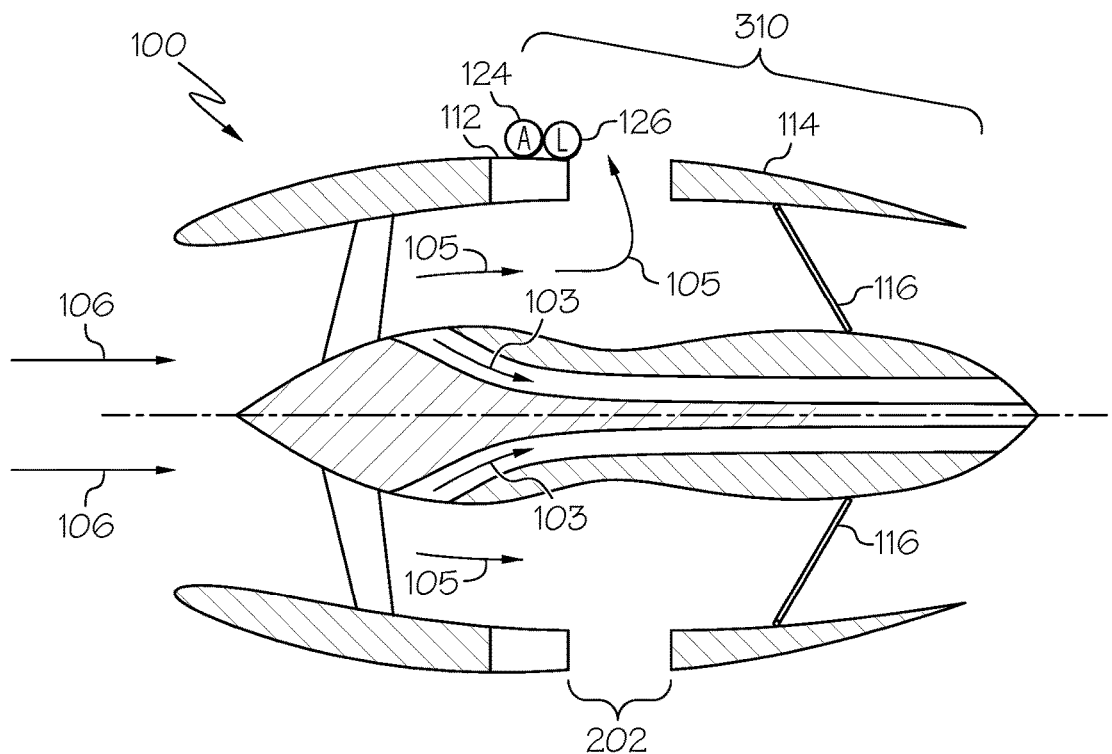

A turbofan engine is a component of an aircraft's propulsion system that typically generates thrust by means of an accelerating mass of gas. Simplified cross section views of a traditional aircraft turbofan engine 100 are depicted in FIGS. 1-4. In particular, FIGS. 1 and 2 depict the engine 100 equipped with a mixed flow thrust reverser system, and with the thrust reverser system in a stowed position and deployed position, respectively, and FIGS. 3 and 4 depict the engine 100 equipped with a fan flow thrust reverser system, and with the thrust reverser system in a stowed position and deployed position, respectively.

Referring first to FIGS. 1 and 2, the turbofan engine 100 includes a gas turbine engine 102 that is encased within an aerodynamically smooth outer covering, generally referred to as the nacelle 104. Ambient air 106 is drawn into the nacelle 104 via a rotationally mounted fan 108 to thereby supply engine airflow. A portion of the engine airflow is drawn into the gas turbine engine 102, where it is pressurized, and mixed with fuel and ignited, to generate hot gasses known as core flow 103. The remainder of engine airflow bypasses the gas turbine engine 102 and is known as fan flow 105. The core flow 103 and the fan flow 105 mix downstream of the gas turbine engine 102 to become the engine exhaust flow 107, which is discharged from the turbofan engine 100 to generate forward thrust.

The nacelle 104 comprises a mixed flow thrust reverser system 110. The thrust reverser system 110 includes a support structure 112, an annular translatable cowl, or transcowl 114, and one or more doors 116 (two in the depicted embodiment). The transcowl 114 is mounted on the support structure 112 and has an inner surface 118 and an outer surface 122. The transcowl 114 is axially translatable, relative to the support structure 112, between a stowed position, which is the position depicted in FIG. 1, a deployed position, which is the position depicted in FIG. 2, and an over-stow position, which is depicted and described further below. In the stowed position, the transcowl 114 is displaced from the support structure 112 by a first distance to form a stowed position aperture 113. In the deployed position, the transcowl 114 is displaced from the support structure 112 by a second distance, which is larger than the first distance, to form a reverse thrust aperture 202 (see FIG. 2). As will be described further below, in the over-stow position, the transcowl 114 is displaced from the support structure 112 by a third distance that is less than the first distance, thereby decreasing the size of the stowed position aperture 113.

Each of the one or more doors 116, at least in the depicted embodiment, is pivotally coupled to the support structure 112. It will be appreciated, however, that in other embodiments each door 116 could instead be coupled to any component that is rigidly attached to the turbofan engine. Regardless, each door 116 is rotatable between a first position, which is the position depicted in FIG. 1, a second position, which is the position depicted in FIG. 2, and a third position, which is described further below. More specifically, each door 116 is rotatable between the first position, the second position, and the third position when the transcowl 114 translates between the stowed position, the deployed position, and the over-stow position, respectively. As is generally known, each door 116 is configured, when it is in the second position, to redirect at least a portion of the engine airflow through the reverse thrust aperture 202 to thereby generate reverse thrust. In particular, at least a portion of the engine exhaust flow 107 (e.g., mixed core flow 103 and fan flow 105) is redirected through the reverse thrust aperture 202.

Referring now to FIGS. 3 and 4, the turbofan engine 100 equipped with a fan flow thrust reverser system 310 will be briefly described. Before doing so, however, it is noted that like reference numerals in FIGS. 1-4 refer to like parts, and that descriptions of the like parts of the depicted turbofan engines 100 will not be repeated. The notable difference between the turbofan engine 100 depicted in FIGS. 3 and 4 is that the fan flow thrust reverser system 310 is disposed further upstream than that of the mixed flow thrust reverser system 110 depicted in FIGS. 1 and 2.

As with the mixed flow thrust reverser system 110, the depicted fan flow thrust reverser system 310 includes the support structure 112, the transcowl 114, and the one or more doors 116 (again, two in the depicted embodiment). Moreover, each door 116 is rotatable between a first position, which is the position depicted in FIG. 3, a second position, which is the position depicted in FIG. 4, and a third position, which is described further below. Similarly, each door 116 is rotatable between the first position, the second position, and the third position when the transcowl 114 translates between the stowed position, the deployed position, and the over-stow position, respectively. As is generally known, each door 116 is configured, when it is in the second position, to redirect at least a portion of the engine airflow through the reverse thrust aperture 202 to thereby generate reverse thrust. In this case, however, only fan bypass flow 105 is redirected through the reverse thrust aperture 202.

As FIGS. 1-4 also depict, the thrust reverser systems 110, 310 additionally include a plurality of actuators 124 (only one depicted) and one or more locks 126 (only one depicted). The actuators 124 are coupled to the support structure 112 and the transcowl 114, and are configured to supply an actuation force to the transcowl 114. It will be appreciated that the actuators 124 may be implemented using any one of numerous types of electric, hydraulic, or pneumatic actuators. Regardless of the type of actuators 124 that are used, each is responsive to commands supplied from a non-illustrated actuation control system to supply an actuation force to the transcowl 114, to thereby move the transcowl 114 between the stowed position, the deployed position, and the over-stow position.

Each lock 126 is coupled to the support structure 112 and is movable between a locked position and an unlocked position. It will be appreciated that the locks 126 may be variously configured, and may be moved between the locked and unlocked positions electrically, hydraulically, or pneumatically. Various particular configurations are described further below. Regardless, of the particular configuration that is used, each lock 126 is responsive to commands supplied from the non-illustrated actuation control system to move between the locked and unlocked positions. In the locked position, transcowl translation from the stowed position into the deployed position is prevented, and in the unlocked position, transcowl translation from the stowed position into the deployed position is allowed. Moreover, each lock 126 is configured such that, when the transcowl 114 is in the stowed position, movement of the lock from the locked position to the unlocked position is prevented. Each lock can move to the unlocked position only when the transcowl 114 is in the over-stow position.

Figure 5:
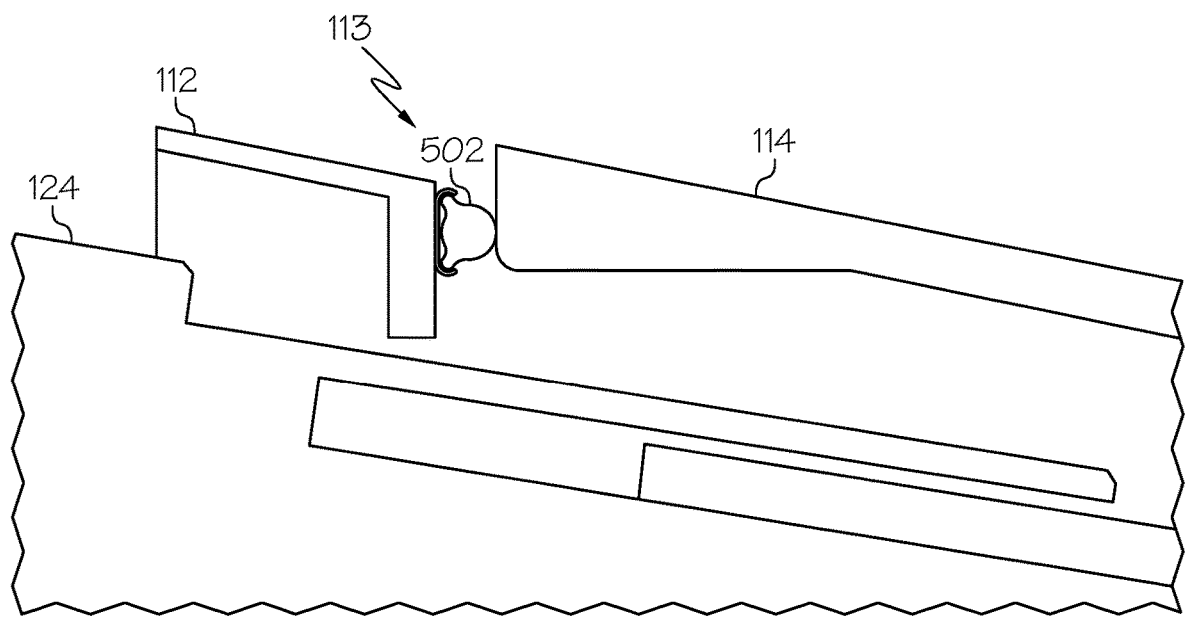
FIG. 5 depicts a close-up cross section view of a first portion of one embodiment of a thrust reverser system that may be implemented in the turbofan engines of FIGS. 1-4 with the transcowl in a stowed position.
Figure 6:
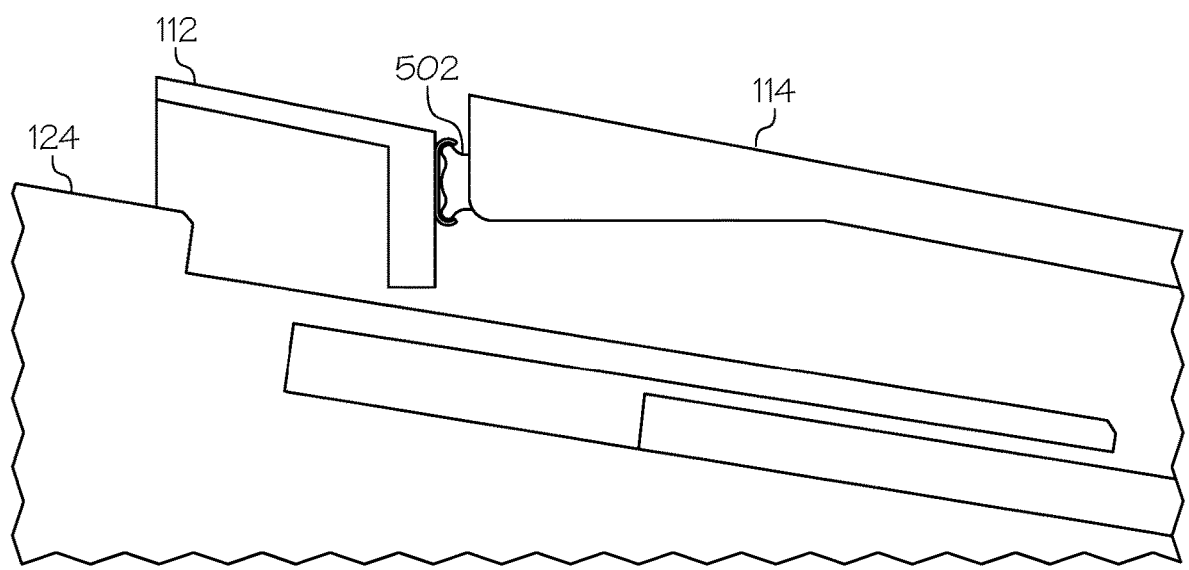
FIG. 6 depicts the close-up cross section view of the first portion of the thrust reverser system of FIG. 5 but with the transcowl in an over-stow position.

With reference now to FIGS. 5 and 6, it is seen that both thrust reverser systems 110, 310 additionally include a first elastic element 502. The first elastic element 502 is disposed within the stowed position aperture 113 and engages both the support structure 112 and the transcowl 114 at least when the transcowl 114 is in the stowed position (FIG. 5), the over-stow position (FIG. 6), and any position between these two positions. The first elastic element 502 is configured, when engaging both the support structure 112 and the transcowl 114, to supply a force to the transcowl 114 that biases the transcowl 114 toward the deployed position. As may be appreciated, the force that the first elastic element 502 supplies to the transcowl 114 when the transcowl 114 is in the over-stow position is greater than the force it supplies when the transcowl 114 is in the stowed position.

It will be appreciated that the first elastic element 502 may be variously mounted. In the depicted embodiment the first elastic element 502 is mounted on the support structure 112 and extends into the stowed position aperture 113. In other embodiments, however, the first elastic element 502 could be mounted on the transcowl 114. It will additionally be appreciated that the first elastic element 502 may be formed of any one of numerous elastic or elastomeric materials. For example, it may be formed of rubber, plastic, metal, or composite material. In the depicted embodiment, however, it is formed of a fiber reinforced silicone rubber. Moreover, although a single first elastic element 502 is depicted, multiple first elastic elements 502 could be used.

Figure 7:
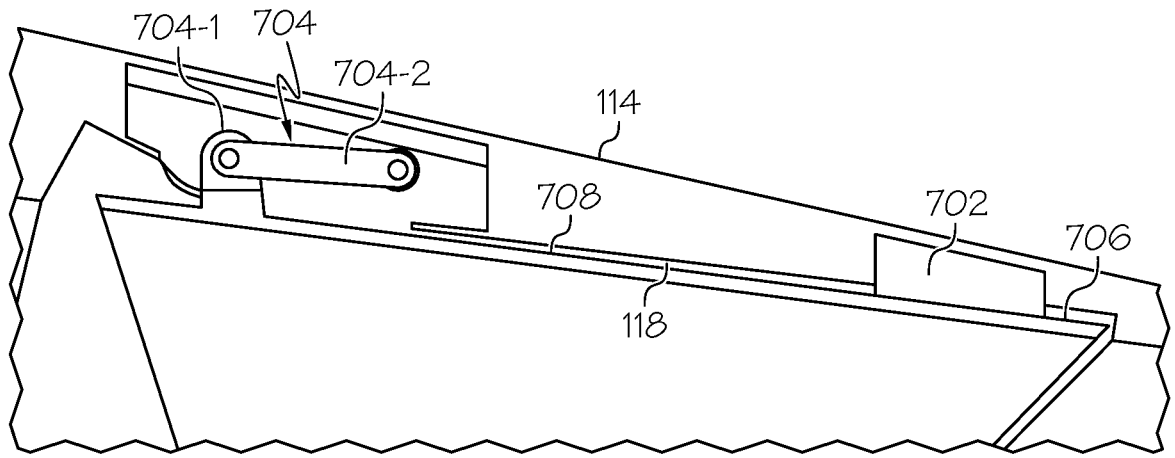
FIG. 7 depicts a close-up cross section view of a second portion of one embodiment of a thrust reverser system that may be implemented in the turbofan engines of FIGS. 1-4 with the transcowl and doors in a stowed position.
Figure 8:
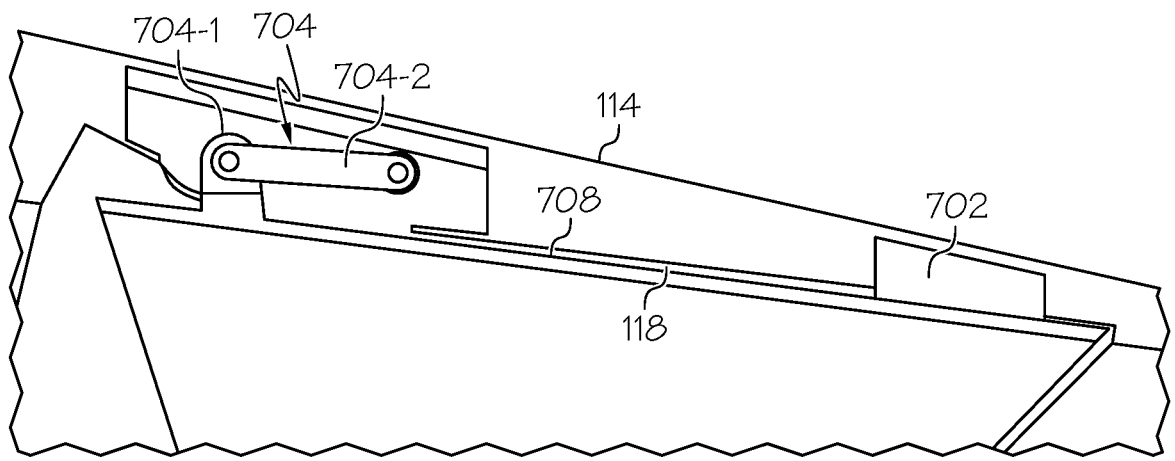
FIG. 8 depicts a close-up cross section view of the second portion of the thrust reverser system of FIG. 7 but with the transcowl and doors in an over-stow position.

Turning now to FIGS. 7 and 8, the depicted thrust reverser systems 110, 310 further include a plurality of second elastic elements 702 (only one depicted) and one or more linkage assemblies 704 (only one depicted). The second elastic elements 702 are each coupled to the transcowl 114 and extend inwardly therefrom. More specifically, at least in the depicted embodiment, the second elastic elements 702 are coupled to the inner surface 118 of the transcowl 114, and extend into a gap 706 that is defined between the inner surface 118 of the transcowl 114 and the outer surface 708 of each door 116. The second elastic elements 702 are sized and configured to engage one of the doors 116 at least when the doors 116 are in the third position. In the depicted embodiment, the second elastic elements 702 are each sized and configured to engage one of the doors 116 when the doors 116 are in both the first position (FIG. 7) and the third position (FIG. 8). Moreover, each of the second elastic elements 702 is configured, at least when the doors 116 are in the third position, to supply a bias force that biases the door 116 it engages toward the first position.

It will be appreciated that, like the first elastic element 502, the second elastic elements 702 may be formed of any one of numerous elastic or elastomeric materials. For example, each may be formed of rubber, plastic, metal, or composite material. In the depicted embodiment, however, each is formed of a fiber reinforced silicone rubber.

Each linkage assembly 704 is coupled to the transcowl 114 and to one of the doors 116 and is configured to cause the doors 116 to rotate between the first, second, and third positions when the transcowl 114 translates between the stowed, deployed position, and over-stow positions, respectively. In the depicted embodiment, each linkage assembly 704 is implemented using a plurality of link elements 704-1, 704-2 so as to achieve the necessary motion and transmit the necessary force between the door 116 and the transcowl 114.

Preferably, the thrust reverser system includes redundant linkage assemblies 704 such that if one linkage assembly were unable to transmit the necessary force, the remaining linkage assembly(ies) would still transmit the force. It will be appreciated that although the linkage assembly 704 is depicted as being implemented with two link elements 704-1, 704-2, it could additionally be implemented using more or fewer link elements.

The locks 126, as previously noted, are configured such that, when the transcowl 114 is in the stowed position movement of the lock from the locked position to the unlocked position is prevented. Each lock can move to the unlocked position only when the transcowl 114 is moved to the over-stow position. The locks 126 and associated structure (i.e., the support structure 112 and transcowl 114) may be variously configured to implement this functionality. Some example lock 126 configurations are depicted in FIGS. 9-17, and will now be described.

Figures 9, 10:
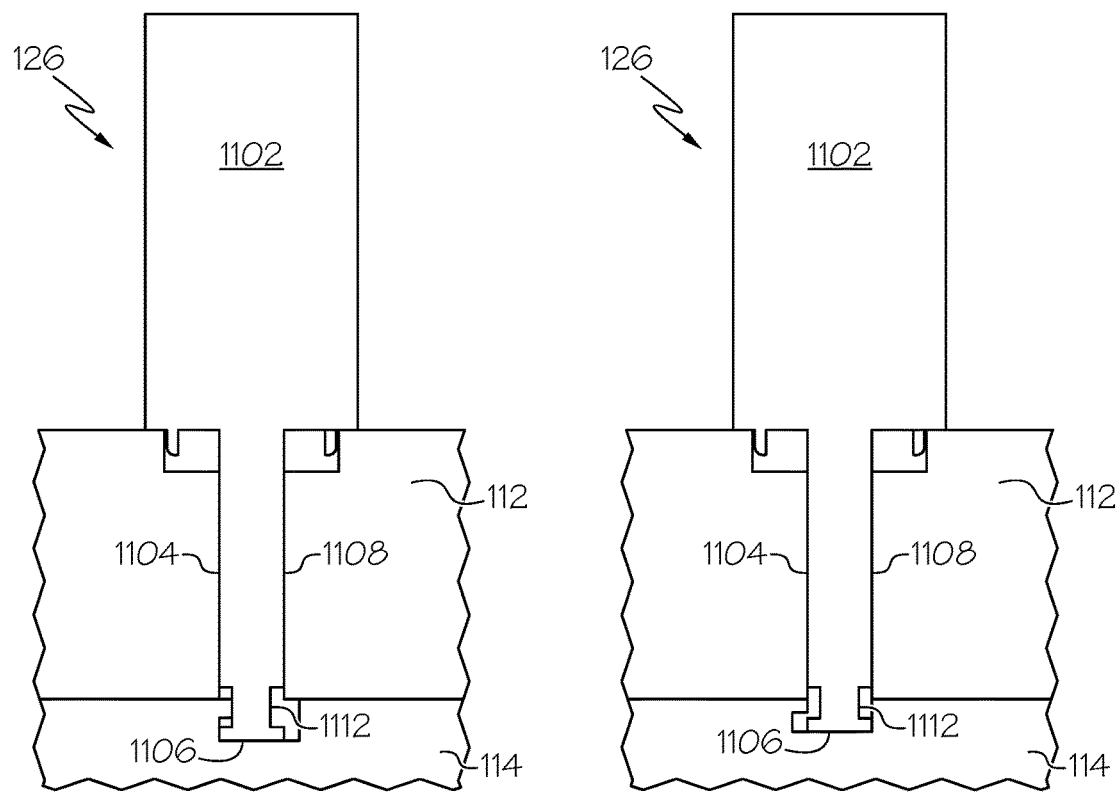
FIGS. 9-11 depict one embodiment of a locking system that may be implemented in the thrust reverser systems of FIGS. 1-4.
Figure 11:
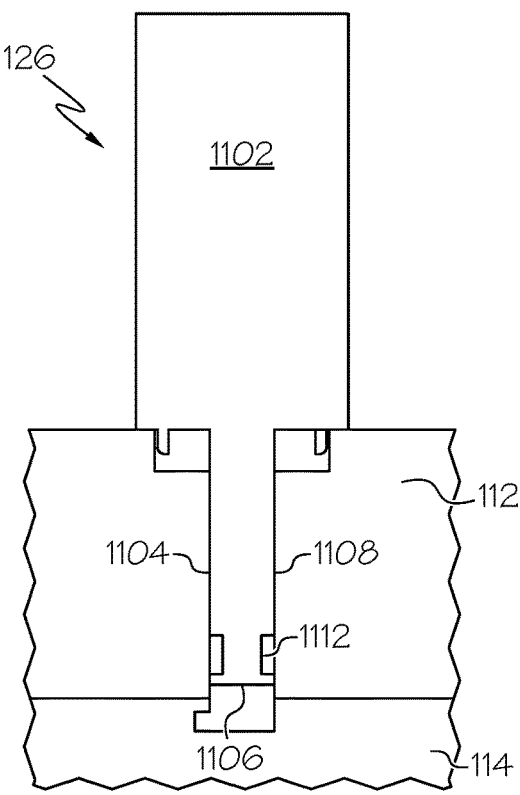

Referring first to FIGS. 9-11, in one embodiment each lock 126 includes a lock actuator 1102 and a pin 1104. The lock actuator 1102 is mounted on the support structure 112 and is responsive to commands received from the non-illustrated actuation control system to move between the locked and unlocked positions. The pin 1104 is coupled to, and extends from, the lock actuator 1102 to an engagement end 1106. The pin 1104, in response to lock actuator movement between the locked position and the unlocked position, translates between an extended position (FIGS. 9 and 10) and a retracted position (FIG. 11), respectively. The pin 1104 extends through an opening 1108 in the support structure 112 and has a groove 1112 formed in the engagement end 1106.

As FIG. 9 depicts, when the pin 1104 is in the extended position and the transcowl 114 is in the stowed position, a portion of the transcowl 114 is disposed in the groove 1112. Thus, the transcowl 114 is prevented from translating toward the deployed position, and the pin 1104 is prevented from translating to the retracted position. However, as FIG. 10 depicts, the transcowl 114 may translate from the stowed position to the over-stow position. As a result, and as depicted in FIG. 11, the pin 1104 may then translate to the retracted position, allowing the transcowl 114 to translate to the deployed position.

Figure 12:
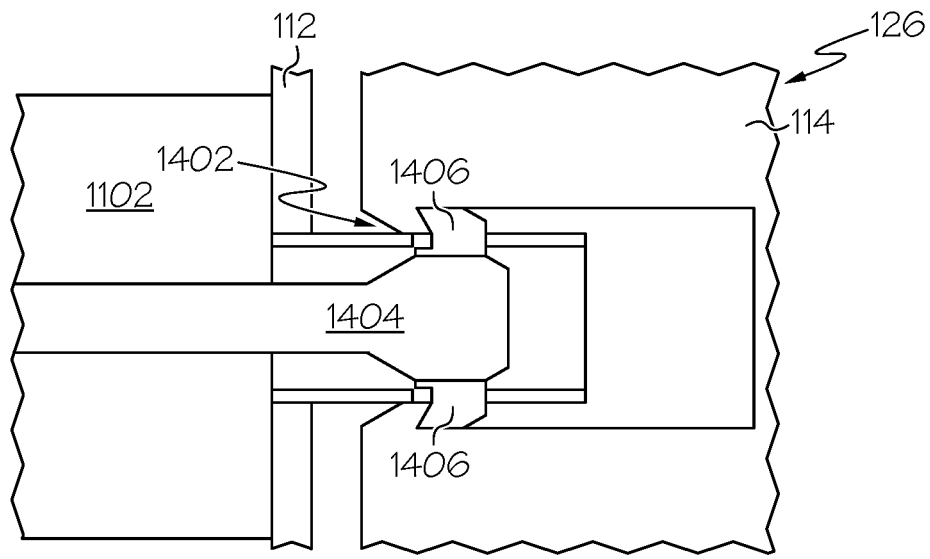
FIGS. 12-14 depict another embodiment of a locking system that may be implemented in the thrust reverser systems of FIGS. 1-4.
Figure 13:
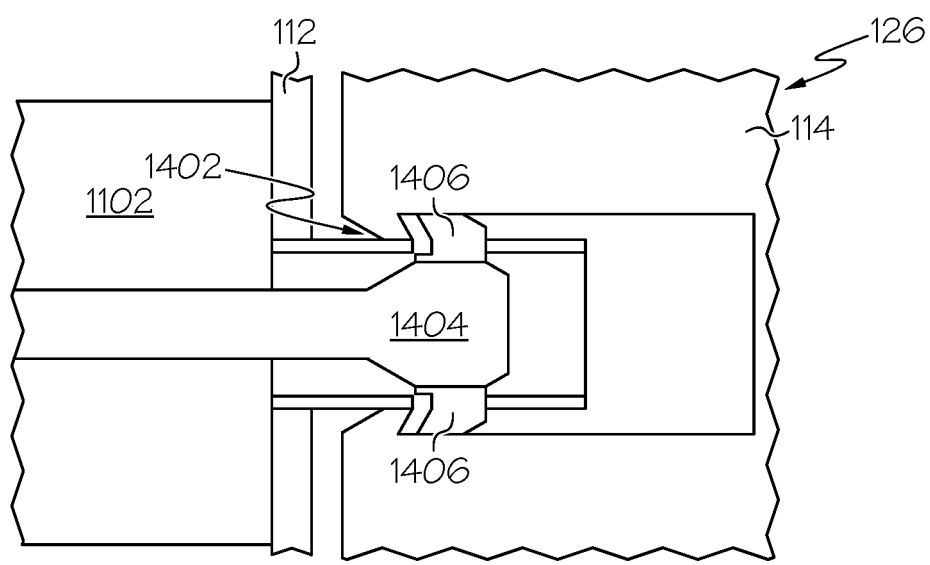
Figure 14:
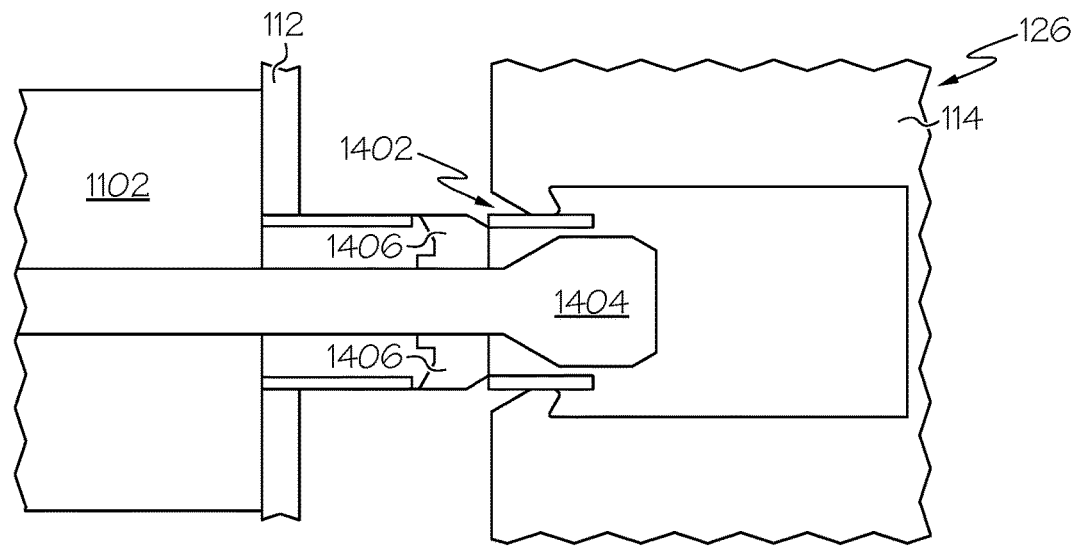

Referring now to FIGS. 12-14, in another embodiment each lock 126 extends through an opening 1402 in the transcowl 114 and includes a lock actuator 1102, a pin 1404, and a plurality of lock segments 1406. The lock actuator 1102 is mounted on the support structure 112 and is responsive to commands received from the non-illustrated actuation control system to move between the locked and unlocked positions. The lock pin 1404 and segments 1406 are each responsive to lock actuator movement between the locked position and the unlocked position to move between an extended position (FIGS. 12 and 13) and a retracted position (FIG. 14), respectively.

As FIG. 12 depicts, when the lock segments 1406 are in the extended position and the transcowl 114 is in the stowed position, a portion of the transcowl 114 is engaged by each of the lock segments 1406. Thus, the transcowl 114 is prevented from translating toward the deployed position and the lock segments 1406 are prevented from moving to the retracted position. However, as FIG. 13 depicts, the transcowl 114 may translate from the stowed position to the over-stow position. As a result, and as depicted in FIG. 14, the lock segments 1406 may then move to the retracted position, allowing the transcowl 114 to translate to the deployed position.

Figure 15:
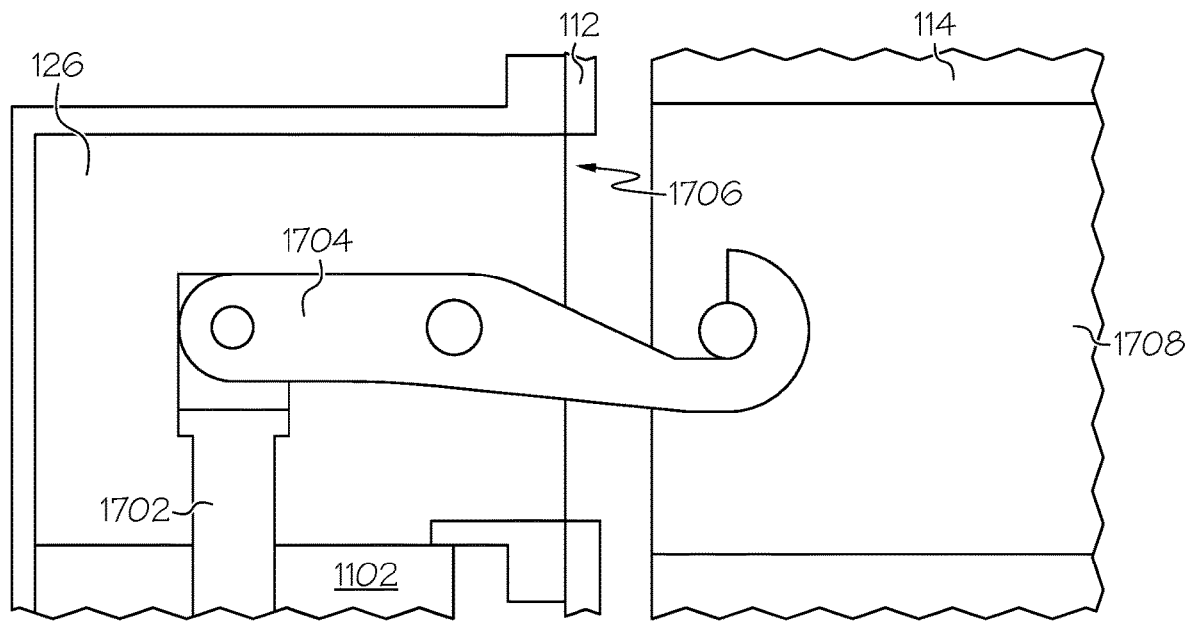
FIGS. 15-17 depict yet another embodiment of a locking system that may be implemented in the thrust reverser systems of FIGS. 1-4.
Figure 16:
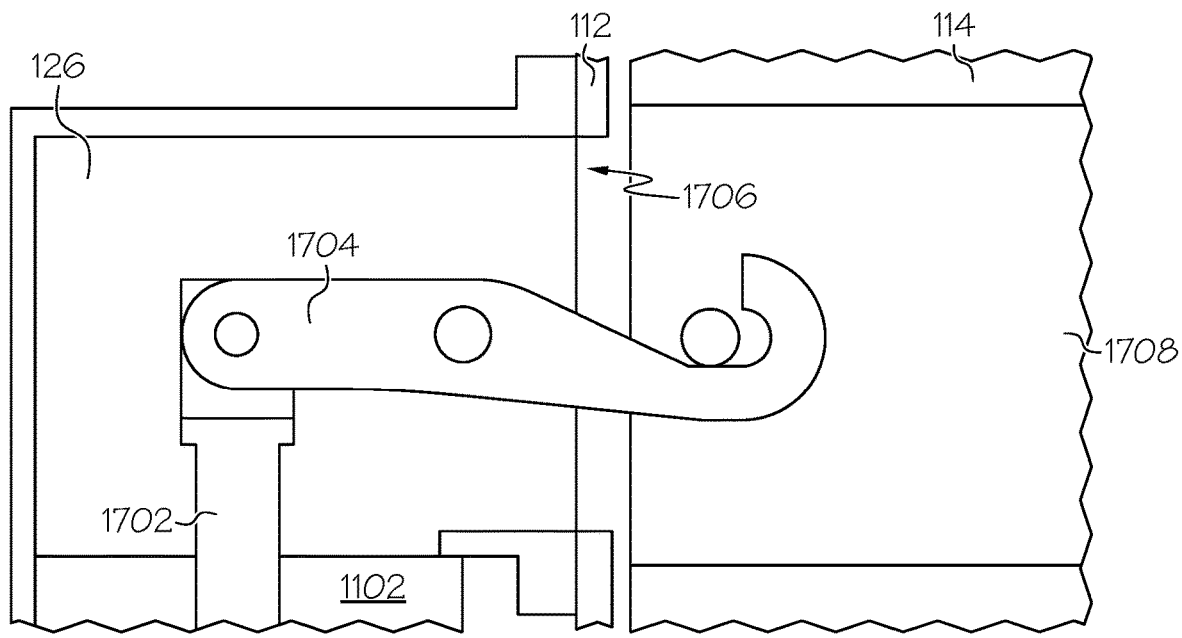
Figure 17:
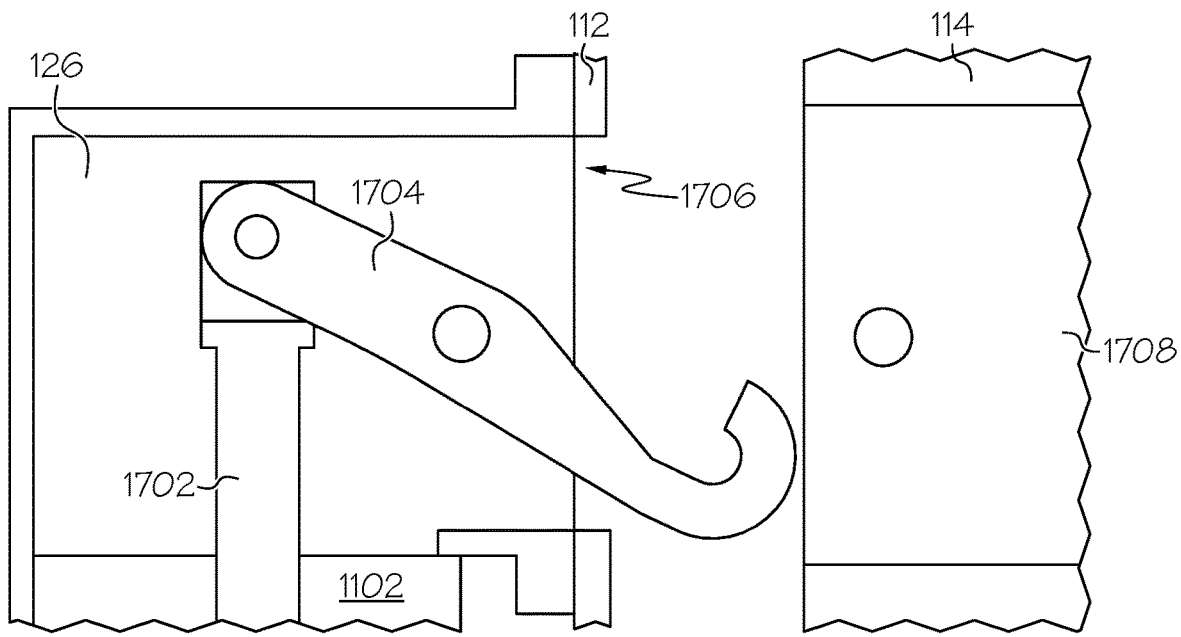

In yet another embodiment, which is depicted in FIGS. 15-17, each lock 126 includes a lock actuator 1102, a rod 1702, and a hook 1704. The lock actuator 1102 is mounted on the support structure 112 and is responsive to commands received from the non-illustrated actuation control system to move between the locked and unlocked positions. The hook 1704 is coupled to the lock actuator 1102, by rod 1702, and is rotationally mounted on the support structure 112. The hook 1704, in response to lock actuator movement between the locked position and the unlocked position, rotates between a first rotational position (FIGS. 15 and 16) and a second rotational position (FIG. 17), respectively. The hook 1704 extends through an opening 1706 in the support structure 112 and into an opening 1708 in the transcowl 114.

As FIG. 15 depicts, when the hook 1704 is in the first rotational position and the transcowl 114 is in the stowed position, a portion of the transcowl 114 is engaged by the hook 1704. Thus, the transcowl 114 is prevented from translating toward the deployed position, and the hook 1704 is prevented from rotating to the second rotational position. However, as FIG. 16 depicts, the transcowl 114 may translate from the stowed position to the over-stow position. As a result, and as depicted in FIG. 17, the hook 1704 may then rotate to the second rotational position, allowing the transcowl 114 to translate to the deployed position.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A thrust reverser system for a turbine engine, comprising:
   a support structure configured to be mounted to the turbine engine;
   a transcowl mounted on the support structure and including an inner surface, the transcowl axially translatable, relative to the support structure, between (i) a stowed position, in which the transcowl is displaced from the support structure by a first distance to form a stowed position aperture, (ii) a deployed position, in which the transcowl is displaced from the support structure a second distance that is larger than the first distance, and (iii) an over-stow position, in which the transcowl is displaced from the support structure by a third distance that is less than the first distance, thereby decreasing the size of the stowed position aperture;
   a door including an outer surface and spaced apart from the transcowl to define a gap between the inner surface of the transcowl and the outer surface of the door, the door pivotally coupled to the support structure and rotatable between at least a first position, a second position, and a third position when the transcowl translates between the stowed position, the deployed position, and the over-stow position, respectively, the door configured, when it is in the second position, to redirect engine airflow to thereby generate reverse thrust;
   an actuator coupled to the support structure and the transcowl and configured to supply an actuation force to move the transcowl between the stowed position, the deployed position, and the over-stow position;
   a lock coupled to the support structure and movable between a locked position, in which transcowl translation toward the deployed position is prevented, and an unlocked position, in which transcowl translation toward the deployed position is allowed, the lock configured so that it is prevented from moving from the locked position to the unlocked position when the transcowl is in the stowed position and is only able to move to the unlocked position when the transcowl is in the over-stow position; and
   a first elastic element disposed within the stowed position aperture and engaging both the support structure and the transcowl at least when the transcowl is in and between the stowed and over-stow positions, the first elastic element configured, when engaging both the support structure and the transcowl, to supply a force to the transcowl that biases the transcowl toward the deployed position, the force in the over-stow position greater than the force in the stowed position.

2. The system of claim 1, further comprising:
   a linkage assembly coupled to the door and to the transcowl, the linkage assembly configured to cause the door to rotate between the first, second, and third positions when the transcowl translates between the stowed, deployed position, and over-stow positions, respectively.

3. The system of claim 1, wherein:
   the lock includes a pin that translates between an extended position and a retracted position when the lock is in the locked position and the unlocked position, respectively, the pin having a groove formed in a portion thereof; and
   a portion of the transcowl is disposed in the groove when the lock is in the locked position and the transcowl is in the stowed position to thereby prevent the pin from moving to the retracted position when the transcowl is in the stowed position.

4. The system of claim 1, wherein:
   the lock includes a plurality of lock segments that are each movable between an extended position and a retracted position when the lock is in the locked position and the unlocked position, respectively; and a portion of the transcowl is engaged by each of the lock segments when the lock is in the locked position and the transcowl is in the stowed position to thereby prevent the lock segments from moving to the retracted position when the transcowl is in the stowed position.

5. The system of claim 1, wherein:
the lock includes a hook that is rotatable between a first rotational position and a second rotational position when the lock is in the locked position and the unlocked position, respectively; and
a portion of the transcowl is engaged by the hook when the lock is in the locked position and the transcowl is in the stowed position to thereby prevent the hook from moving to the second rotational position when the transcowl is in the stowed position.

6. A thrust reverser system for a turbine engine, comprising:
a support structure configured to be mounted to the turbine engine;
a transcowl mounted on the support structure and including an inner surface, the transcowl mounted on the support structure and axially translatable, relative to the support structure, between (i) a stowed position, in which the transcowl is displaced from the support structure by a first distance to form a stowed position aperture, (ii) a deployed position, in which the transcowl is displaced from the support structure a second distance that is larger than the first distance, and (iii) an over-stow position, in which the transcowl is displaced from the support structure by a third distance that is less than the first distance, thereby decreasing the size of the stowed position aperture;
a plurality of doors pivotally coupled to the support structure, each door including an outer surface and spaced apart from the transcowl to define a gap between the inner surface of the transcowl and the outer surface of the door, each door rotatable between at least a first position, a second position, and a third position when the transcowl translates between the stowed position, the deployed position, and the over-stow position, respectively, each door configured, when it is in the second position, to redirect engine airflow to thereby generate reverse thrust;
a plurality of actuators coupled to the support structure and the transcowl, each actuator configured to supply an actuation force to move the transcowl between the stowed position, the deployed position, and the over-stow position;
a lock coupled to the support structure and movable between a locked position, in which transcowl translation toward the deployed position is prevented, and an unlocked position, in which transcowl translation toward the deployed position is allowed, the lock configured so that it is prevented from moving from the locked position to the unlocked position when the transcowl is in the stowed position and is only able to move to the unlocked position when the transcowl is in the over-stow position; and
a first elastic element disposed within the stowed position aperture and engaging both the support structure and the transcowl at least when the transcowl is in and between the stowed and over-stow positions, the first elastic element configured, when engaging both the support structure and the transcowl, to supply a force to the transcowl that biases the transcowl toward the deployed position, the force in the over-stow position greater than the force in the stowed position.

7. The system of claim 6, further comprising:
at least one linkage assembly coupled to each door and to the transcowl and configured to cause the doors to rotate between the first, second, and third positions when the transcowl translates between the stowed, deployed position, and over-stow positions, respectively.

8. The system of claim 6, wherein:
the lock includes a pin that translates between an extended position and a retracted position when the lock is in the locked position and the unlocked position, respectively, the pin having a groove formed in a portion thereof; and
a portion of the transcowl is disposed in the groove when the lock is in the locked position and the transcowl is in the stowed position to thereby prevent the pin from moving to the retracted position when the transcowl is in the stowed position.

9. The system of claim 6, wherein:
the lock includes a plurality of lock segments that are each movable between an extended position and a retracted position when the lock is in the locked position and the unlocked position, respectively; and
a portion of the transcowl is engaged by each of the lock segments when the lock is in the locked position and the transcowl is in the stowed position to thereby prevent the lock segments from moving to the retracted position when the transcowl is in the stowed position.

10. The system of claim 6, wherein:
the lock includes a hook that is rotatable between a first rotational position and a second rotational position when the lock is in the locked position and the unlocked position, respectively; and
a portion of the transcowl is engaged by the hook when the lock is in the locked position and the transcowl is in the stowed position to thereby prevent the hook from moving to the second rotational position when the transcowl is in the stowed position.

11. A turbofan or turbojet engine, comprising:
a gas turbine engine; and
a nacelle coupled to and at least partially surrounding the gas turbine engine, the nacelle comprising a thrust reverser system that includes:
a support structure configured to be mounted to the turbine engine;
a transcowl mounted on the support structure and axially translatable, relative to the support structure, between (i) a stowed position, in which the transcowl is displaced from the support structure by a first distance to form a stowed position aperture, (ii) a deployed position, in which the transcowl is displaced from the support structure a second distance that is larger than the first distance, and (iii) an over-stow position, in which the transcowl is displaced from the support structure by a third distance that is less than the first distance, thereby decreasing the size of the stowed position aperture;
a plurality of doors pivotally coupled to the support structure, each door rotatable between at least a first position, a second position, and a third position when the transcowl translates between the stowed position, the deployed position, and the over-stow position, respectively, each door configured, when it is in the second position, to redirect engine airflow to thereby generate reverse thrust;
a plurality of actuators coupled to the support structure and the transcowl, each actuator configured to supply an actuation force to move the transcowl between the stowed position, the deployed position, and the over-stow position;

a lock coupled to the support structure and movable between a locked position, in which transcowl translation toward the deployed position is prevented, and an unlocked position, in which transcowl translation toward the deployed position is allowed, the lock configured so that it is prevented from moving from the locked position to the unlocked position when the transcowl is in the stowed position and is only able to move to the unlocked position when the transcowl is in the over-stow position; and a first elastic element disposed within the stowed position aperture and engaging both the support structure and the transcowl at least when the transcowl is in and between the stowed and over-stow positions, the first elastic element configured, when engaging both the support structure and the transcowl, to supply a force to the transcowl that biases the transcowl toward the deployed position, the force in the over-stow position greater than the force in the stowed position.

12. The turbofan or turbojet engine of claim 11, further comprising:

at least one linkage assembly coupled to each door and to the transcowl and configured to cause the doors to rotate between the first, second, and third positions when the transcowl translates between the stowed, deployed position, and over-stow positions, respectively.

\* \* \* \* \*